(12) United States Patent
Porte et al.

(10) Patent No.: US 9,719,422 B2
(45) Date of Patent: Aug. 1, 2017

(54) PROCESS FOR THE PRODUCTION OF AN ACOUSTIC TREATMENT PANEL THAT INTEGRATES CHANNELS JUXTAPOSED WITH AN ALVEOLAR STRUCTURE

(75) Inventors: Alain Porte, Colomiers (FR); Frederic Chelin, Encausse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 764 days.

(21) Appl. No.: 13/527,100

(22) Filed: Jun. 19, 2012

(65) Prior Publication Data

US 2012/0318029 A1    Dec. 20, 2012

(30) Foreign Application Priority Data

Jun. 20, 2011 (FR) ..................... 11 55383

(51) Int. Cl.
*B21D 47/00* (2006.01)
*F02C 7/045* (2006.01)
*B64D 33/02* (2006.01)

(52) U.S. Cl.
CPC .............. *F02C 7/045* (2013.01); *B21D 47/00* (2013.01); *B64D 33/02* (2013.01); *B64D 2033/0206* (2013.01); *B64D 2033/0233* (2013.01); *F05D 2250/283* (2013.01); *Y02T 50/672* (2013.01)

(58) Field of Classification Search
CPC ....... F02K 1/827; F02C 7/045; G10K 11/168; G10K 11/172; B21D 26/02; B21D 26/021; B21D 26/027; B21D 26/033; B21D 26/041; B21D 39/042; B21D 39/066; B21D 47/00; B32B 3/20; B32B 3/22; B32B 3/12; B23P 11/02; B23P 11/022; B23P 11/025; B23K 20/02–20/028; B23K 20/04

USPC ...... 72/54, 56–58, 60, 61, 63; 181/292, 210, 181/293; 228/20.1, 193–195; 29/421.1, (Continued)

(56) References Cited

U.S. PATENT DOCUMENTS 3,104,194 A * 9/1963 Zahorski .................... 428/116
3,516,895 A * 6/1970 Hartman ................ B21D 47/00
                                                                244/117 R
4,926,963 A * 5/1990 Snyder .......................... 181/290
(Continued)

FOREIGN PATENT DOCUMENTS

FR    2 917 067 A1    12/2008
FR    2 952 032 A1    5/2011

OTHER PUBLICATIONS

French Search Report, dated Jan. 19, 2012, from corresponding French application.

*Primary Examiner* — Debra Sullivan
(74) *Attorney, Agent, or Firm* — Young & Thompson

(57) ABSTRACT

A process for the production of an acoustic treatment panel that includes an acoustically resistive layer (24), at least one alveolar structure (26), and a reflective layer (28), as well as at least one channel that is bordered at least in part by a wall (32) that is secant with at least one wall of a cell of the alveolar structure (26), includes elevating the temperature of the wall (32) and the ends of the cells of the alveolar structure (26) and injecting a pressurized gas into the channel (30) so as to expand the wall (32) of the channel so as to flatten it against the ends of the cells of the alveolar structure (26) in such a way as to produce a weld by continuous diffusion between the ends of the walls of the cells of the alveolar structure (26) and the wall (32) of the channel (30).

11 Claims, 4 Drawing Sheets

Figure 1:
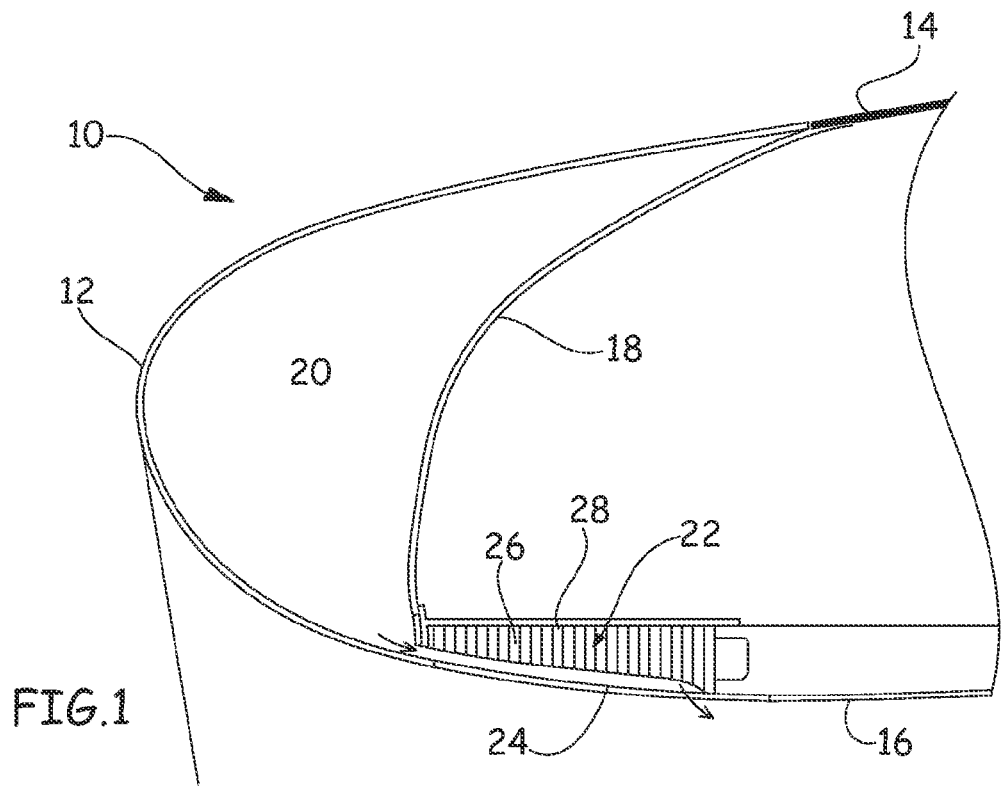

(58) Field of Classification Search
USPC ........ 29/455.1; 264/545; 156/182, 197, 292; 244/131; 428/163, 172, 137
See application file for complete search history.

(56) References Cited

U.S. PATENT DOCUMENTS

| | | | |
|---|---|---|---|
| 4,984,732 A * | 1/1991 | Hudson | B21D 26/055 228/173.2 |
| 5,115,963 A * | 5/1992 | Yasui | 228/157 |
| 2006/0288559 A1 * | 12/2006 | Ghiran | 29/432 |
| 2010/0181420 A1 | 7/2010 | Porte et al. | |
| 2011/0139927 A1 | 6/2011 | Porte et al. | |

* cited by examiner

PROCESS FOR THE PRODUCTION OF AN ACOUSTIC TREATMENT PANEL THAT INTEGRATES CHANNELS JUXTAPOSED WITH AN ALVEOLAR STRUCTURE

BACKGROUND OF THE INVENTION

Field of the Invention

This invention relates to a process for the production of an acoustic treatment panel that integrates channels juxtaposed with an alveolar structure. The channels are designed in particular for hot air that is provided for frost treatment, said panel being able to be arranged at an air intake of an aircraft nacelle.

Description of the Related Art

Such a panel is described in particular in the patent FR-2,917,067. It comprises—from the outside to the inside—an acoustically resistive layer, at least one alveolar structure, and a reflective layer, as well as channels that are each bordered by a wall that is inserted between the acoustically resistive layer and the alveolar structure.

This solution makes it possible to limit the risks of communication between the inside of the channels and the cells of the alveolar structure and therefore the risks of disruptions of acoustic treatment.

According to another advantage, the hot air occupies a volume that is considerably smaller relative to the prior solutions, according to which it occupies the volume of certain cells of the alveolar structure, which makes it possible to produce, on the one hand, a better concentration of hot air against the wall to be defrosted, reinforcing the effectiveness of defrosting, and, on the other hand, a higher pneumatic pressure that limits the risk of pressure inside the structure being lower than that of the outside and therefore the penetration of the outside air inside the defrosting system.

According to another advantage, the hot air is in permanent contact with the skin to be defrosted, which makes it possible to improve the exchanges and to reduce the temperature of the hot air that is delivered at the outlet of the defrosting system; this makes it possible to discharge the air without the risk of the wall that it passes through being burned, in particular when this wall is made of a heat-sensitive material such as a composite.

According to a first embodiment that is described in the patent FR-2,917,067, the acoustically resistive layer comes in the form of a first piece of sheet metal. To form the channels, a second piece of sheet metal is shaped in such a way as to produce furrows, and then it is flattened and made integral with the inside surface of the first piece of sheet metal. Next, perforations are made in the two pieces of sheet metal in the areas where they are in contact. In parallel, a first surface of the alveolar structure is made integral with the reflective layer. The other surface of the alveolar structure is cut out in such a way as to form—at said surface—shapes that are complementary to those of the channels. Next, the alveolar structure is made integral with the second layer that borders the channels.

This operating mode makes it possible to simplify the assembly mode because the walls that border all of the channels are connected to one another and originate from the shaping of a single piece of sheet metal.

However, the superposition of two pieces of sheet metal at the perforations leads to having perforations with relatively long lengths, which impacts the operation of the acoustic treatment and makes it less efficient.

According to another operating mode that is described in the patent FR-2,917,067, each channel comes in the form of a strip of shaped material. According to this variant, the strips of material that border the channels are flattened and individually made integral with the inside surface of the first piece of sheet metal.

To ensure the passage of sound waves, the acoustically resistive layer can comprise a cloth that may or may not be metal, such as a wire mesh, and at least one structural layer, for example, sheet metal or a composite with oblong holes or microperforations.

In parallel, a first surface of the alveolar structure is made integral with the reflective layer. The other surface of the alveolar structure is cut out in such a way as to form—at said surface—shapes that are complementary to those of the channels. Next, the alveolar structure is made integral with the second layer that borders the channels.

This operating mode does not impact the operation of the acoustic treatment to the extent that the strips used for forming the channels separate the acoustically resistive layer in the areas that are provided for the acoustic treatment.

However, the installation of the material strips that border the channels on the acoustically resistive layer takes a relatively long time to carry out, especially since the connection between the edges of the strips and the acoustically resistive layer is to be airtight so as not to disrupt the acoustic and/or frost treatments.

According to the two operating modes presented in the patent FR-2,917,067, it is difficult to obtain satisfactory sealing between the pipes of the alveolar structure that empty out facing the channels because it is relatively difficult to weld the ends of the pipes with a surface that is not flat and that has a complex shape.

SUMMARY OF THE INVENTION

Also, the purpose of this application is to remedy the drawbacks of the prior art by proposing a process for the production of an acoustic treatment panel that integrates the channels juxtaposed with an alveolar structure, making it possible to produce a panel that is efficient in terms of both acoustic treatment and frost treatment.

For this purpose, the invention has as its object a process for the production of an acoustic treatment panel that comprises an acoustically resistive layer, at least one alveolar structure, and a reflective layer, as well as at least one channel that is bordered at least in part by a wall that is secant with at least one wall of a cell of the alveolar structure, characterized in that it consists in raising the temperature of the wall and the ends of the cells of the alveolar structure and in injecting a pressurized gas into the channel so as to expand the wall of the channel so as to flatten it against the ends of the cells of the alveolar structure in such a way as to produce a weld by continuous diffusion between the ends of the walls of the cells of the alveolar structure and the wall of the channel.

BRIEF DESCRIPTION OF THE DRAWING FIGURES

Figure 2:
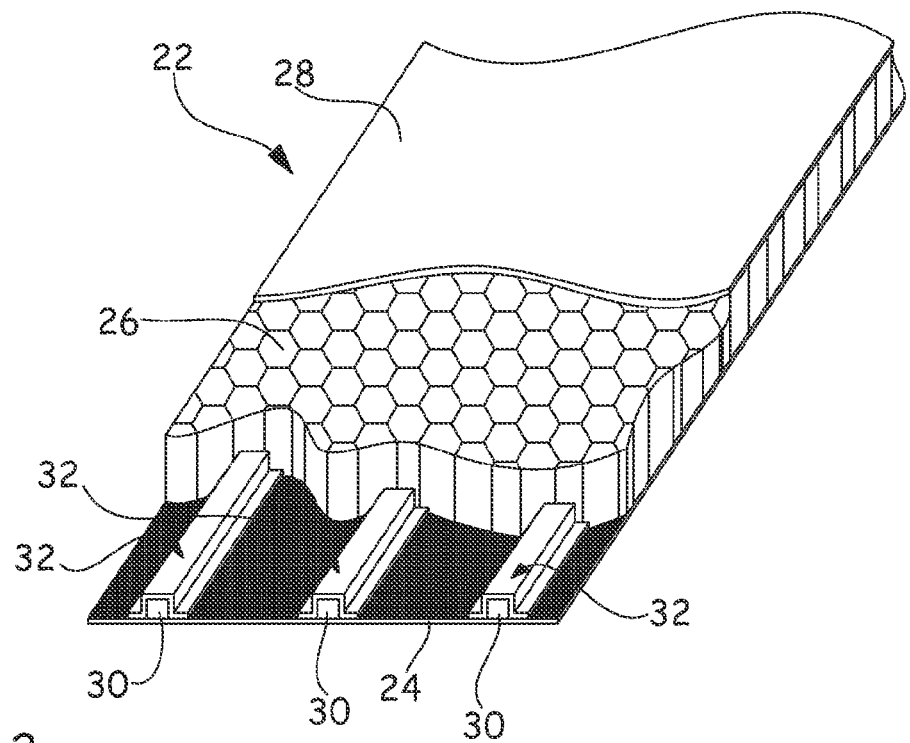
Figure 3A:
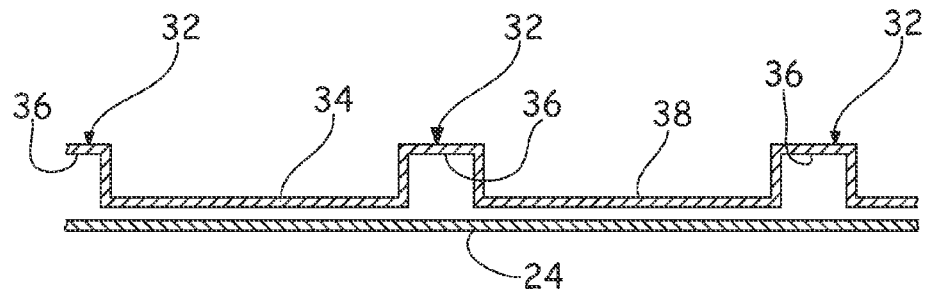
Figure 3B:
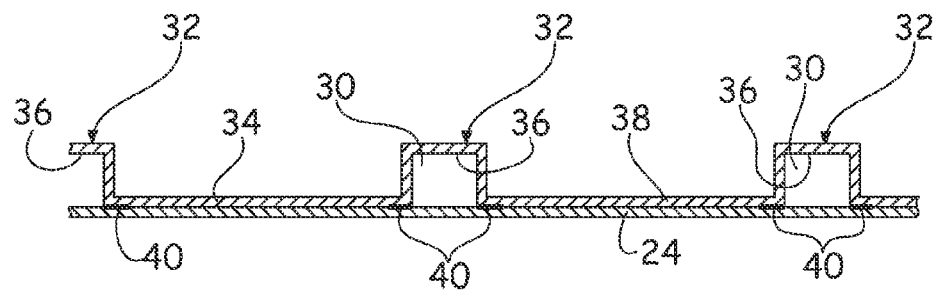
Figure 3C:
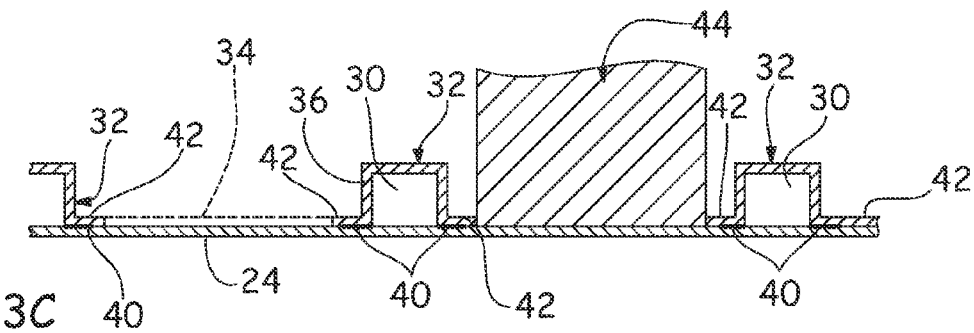
Figure 3D:
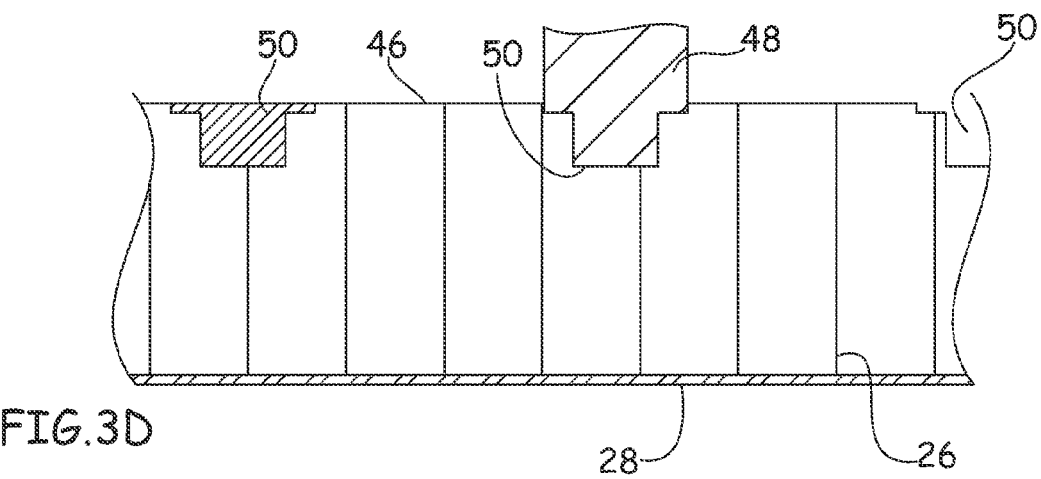
Figure 4A:
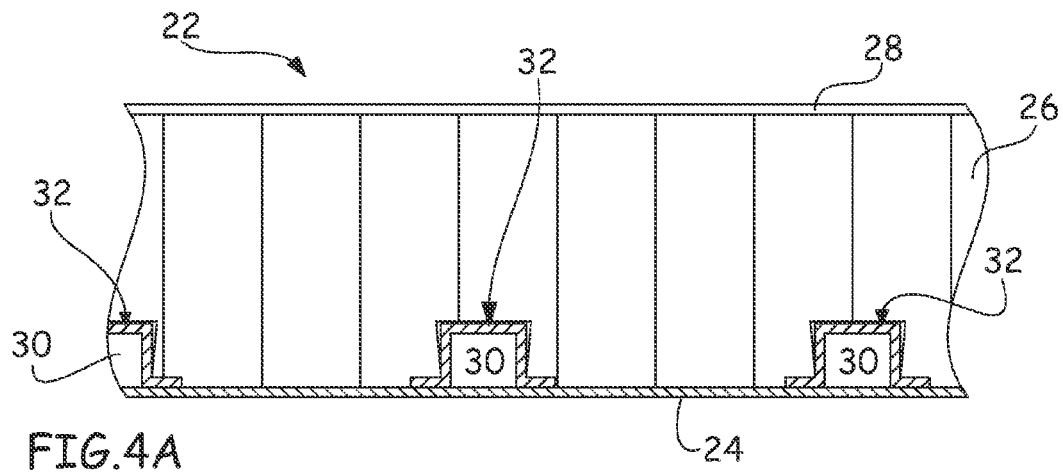
Figure 4B:
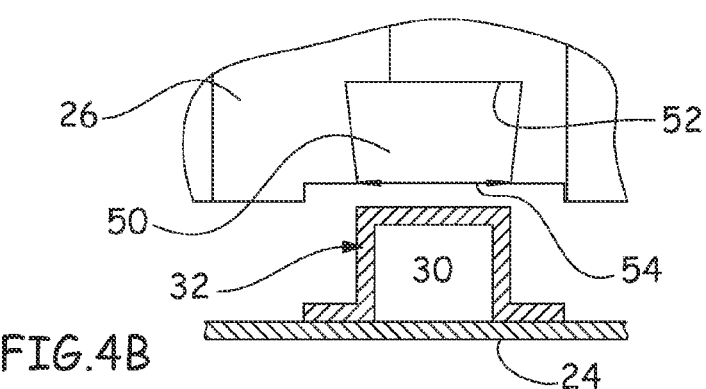
Figure 5A:
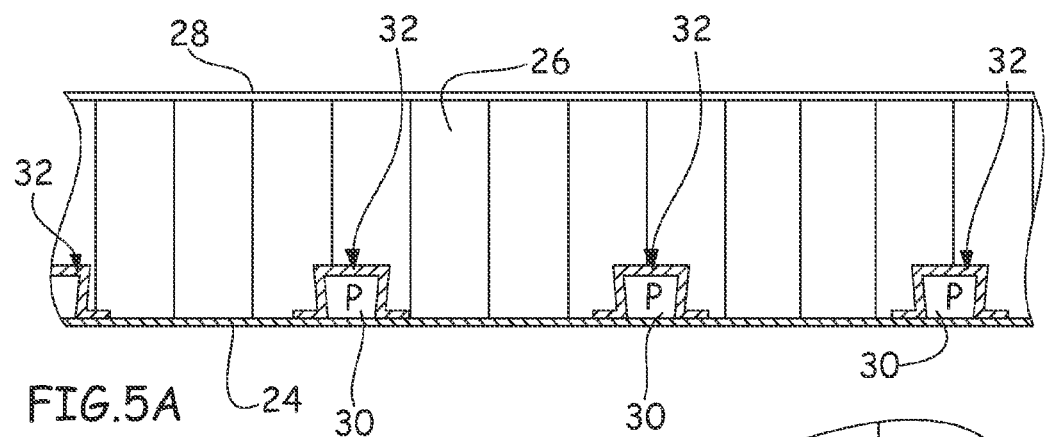
Figure 5B:
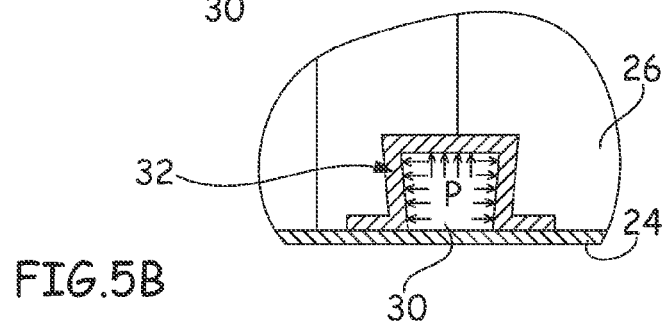
Figure 6:
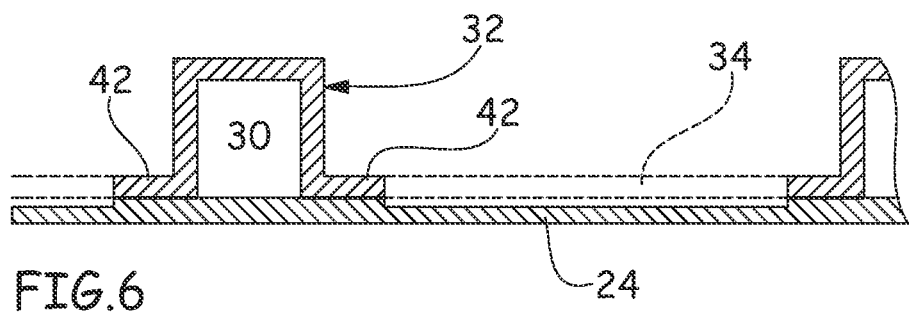
Figure 7:
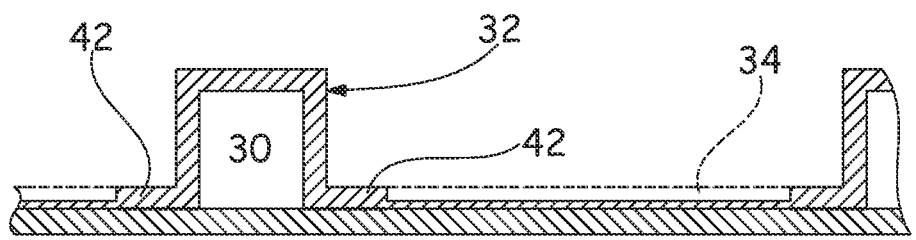

Other characteristics and advantages will emerge from the following description of the invention, a description that is provided only by way of example, with regard to the accompanying drawings, in which:

FIG. 1 is a cutaway of a portion of an air intake of a nacelle of an aircraft incorporating an acoustic treatment panel that integrates the function of frost treatment, FIG. 2 is a perspective view of a portion of an acoustic treatment panel that integrates the function of frost treatment, FIGS. 3A to 3D are cutaways that illustrate the stages of a process for the production of an acoustic treatment panel that integrates the function of frost treatment according to the invention, FIG. 4A is a cutaway that illustrates a first phase of the assembly stage of a panel according to the invention, FIG. 4B is a cutaway that illustrates a detail of FIG. 4A, FIG. 5A is a cutaway that illustrates a second phase of the assembly stage of a panel according to the invention, FIG. 5B is a cutaway that illustrates a detail of FIG. 5A, and FIGS. 6 and 7 are cutaways that illustrate variants of the invention.

DETAILED DESCRIPTION OF THE INVENTION

This invention is now described as applied to an air intake of a propulsion system of an aircraft. However, it can apply to various leading edges of an aircraft where acoustic treatment and frost treatment are combined, for example the leading edges of the wings.

As illustrated in FIG. 1, an air intake 10 of an aircraft nacelle comprises, at the front, a lip 12 of which a first end is extended toward the rear by an outside wall 14 and of which the other end is extended through a pipe 16 that can channel an air flow in the direction of the power plant. A front frame 18 connects the outside wall 14 and the pipe 16 and with the lip 12 borders an annular pipe 20.

To limit the impact of noise pollution, a panel 22 whose purpose is to absorb a portion of the sound energy, in particular by using the principle of Helmholtz resonators, is provided in particular at aerodynamic surfaces. In a known manner, this acoustic treatment panel, also called acoustic coating, comprises—from the outside to the inside—an acoustically resistive structure 24, at least one alveolar structure 26, and a reflective layer 28.

Layer or structure is defined as one or more layers that may or may not be of the same type.

The acoustically resistive structure 24 is a porous structure that has a dissipative role, partially transforming the acoustic energy of the sound wave that passes through it into heat.

According to one embodiment, the acoustically resistive structure 24 comprises at least one porous layer in the form of, for example, a cloth that may or may not be metal, such as a wire mesh, and at least one structural layer, for example, sheet metal or a composite with oblong holes or microperforations.

In all of the cases, the acoustically resistive layer 24 comprises openings that make it possible for the acoustic waves to pass through it.

The reflective structure 28 is impermeable to sound waves.

The alveolar structure 26 corresponds to a volume that is bordered by, on the one hand, a first imaginary surface to which the reflective layer 28 can be connected, and, on the other hand, a second imaginary surface to which the acoustically resistive layer 24 can be connected.

The distance that separates the first imaginary surface and the second imaginary surface cannot be constant.

The alveolar structure 26 comprises a number of pipes that empty out, on the one hand, at the first surface, and, on the other hand, at the second surface. These pipes are sealed by, on the one hand, the acoustically resistive porous structure 24, and, on the other hand, the reflective layer 28, so as to each form a cell.

Preferably, two adjacent pipes are separated by a side wall.

According to an embodiment, the alveolar structure 26 consists of a honeycomb. Thus, the pipes have a hexagonal shape, and the adjacent pipes are separated by side walls.

As a variant, the pipes of the alveolar structure can have other shapes, for example they can have a square cross-section.

These different layers and structures are not described in more detail because they are known to one skilled in the art.

To limit the formation of frost or to prevent its accumulation, the air intake 10 can comprise means for treating frost, using hot air that is taken from the engine to heat the aerodynamic surface. Hereinafter, frost will be defined both as frost and ice, of all types, all structures, and all thicknesses.

In the case of an air intake that incorporates a frost treatment with hot air, a panel 22 that is designed according to the invention can be arranged at the lip, more particularly in the annular pipe 20 at the front of the front frame 18, or it can be placed at the pipe 16, at the rear of the front frame 18.

According to the invention, the acoustic panel 22 comprises at least one pipe or channel 30 that is secant with the walls of the cells of the alveolar structure 26, with the channel 30 being delimited by a wall 32 that is separate from the walls of the alveolar structure 26.

The invention is now described as applied to a panel that combines the acoustic and frost treatment functions in which the pipes 30 are inserted between the alveolar structure 26 and the acoustically resistive structure 24 and are used to convey the hot air for the frost treatment. For this purpose, one of the ends of the channels 30 is connected to a hot air intake.

However, the invention is not limited to this application. Thus, the channels can be used to convey any type of fluid or elements and can be arranged adjacent to the acoustically resistive layer 24 and/or to the reflective layer 28 or away from said layers 24 and 28.

In the different figures, the panel 24 is shown along a cutaway that is transverse to the direction of the channels 30. According to a layout, the channels 30 extend in the longitudinal direction of the nacelle.

According to an embodiment, the channels 30 are produced by the shaping of a layer 34 so as to produce—at one of its surfaces—hollow shapes that form furrows 36 in such a way as to border a portion of the channels 30, as illustrated in FIG. 3A. The furrows may or may not be rectilinear and have constant or variable cross-sections over their lengths.

Preferably, the layer 34 is a metal sheet 38, made of a titanium alloy, for example.

To produce castellated shapes, the piece of sheet metal 38 is shaped by preferably using a superplastic shaping technique. As a variant, the piece of sheet metal 38 can be shaped by any other shaping technique.

Next, the layer 34 with the furrows 36 is flattened and made integral with the inside surface of the acoustically resistive layer 24 in such a way as to produce the channels 30, as illustrated in FIG. 3B.

The technique that is used to ensure the connection between the layer 34 and the acoustically resistive layer 24 essentially depends on the materials of the two layers 34 and 24.

According to one embodiment, it is possible to use a welding technique, in particular by ultrasound. However, other techniques for ensuring the assembly of the two layers 24 and 34 can be used, such as, for example, bonding.

Regardless of the technique used, it is important that the edges 40 coming on either side of the furrows 36 of the layer 34 are both made integral with the layer 24 by a continuous line in such a way as to ensure satisfactory sealing between the channels 30 and the rest of the panel 22.

Next, a removal of material in such a way as to eliminate at least a portion of the thickness of the layer 34 is carried out between the channels 30. According to a first variant that is illustrated in FIG. 3C, between the channels, the entire thickness of the layer 34 is removed, and the thickness of material through which acoustic waves can pass is equal to the thickness of the acoustically resistive layer that is sized in an optimal way for the acoustic treatment. In addition, the fact that the walls 32 that border the channels are connected and come from the same layer 34 makes it possible to simplify the assembly of the elements that border said channels.

According to another variant that is illustrated in FIG. 6, between the channels, the entire thickness of the layer 34 and a slight thickness of the layer 24, preferably less than 25%, are removed. In this case, the thickness of material through which the acoustic waves can pass is slightly smaller than the thickness of the acoustically resistive layer.

According to another variant that is illustrated in FIG. 7, between the channels, only a portion of the thickness of the layer 34, preferably more than 75%, is removed. In this case, the thickness of material through which the acoustic waves can pass is slightly larger than the thickness of the acoustically resistive layer.

Preferably, for each channel, two lugs 42 that are essentially parallel to the layer 24 on either side of the furrows 36 are preserved so that for each channel, the connection between the remainder of the layer 34 and the acoustically resistive layer 24 is resistant and airtight. Advantageously, the lugs 42 have a length of between 2 and 10 mm to obtain a good compromise between a resistant and airtight connection while preserving the maximum functional surface on the acoustic level.

The removal of material can be done by any suitable means, in particular by water jet, for example. Diagrammatically at 44, FIG. 3C shows means for removing the material.

According to the variants, the openings that make it possible for waves to pass through the acoustically resistive layer can be made in said acoustically resistive layer 24 before assembly with the layer 34, can be made in the layers 24 and 34 after assembly but before the removal of material, or can be made in said acoustically resistive layer 24 after assembly and removal of material.

As a variant, the channels 30 could be made in the same way as in the patent FR-2,917,067.

In parallel, the alveolar structure 26 and the reflective layer 28 are assembled, and a removal of material is carried out at the surface 46 of the alveolar structure 26 that can be flattened against the acoustically resistive layer 24, as illustrated in FIG. 3D. Diagrammatically at 48, this figure shows the means for removing the material, such as, for example, a milling cutter. The assembly stage and the means that are used for removing the material are not presented in more detail because they are known to one skilled in the art.

After this stage, the surface 46 comprises cut-outs 50 that can each accommodate a channel 30.

As illustrated in FIG. 4A, the surface 46 of the alveolar structure 26 is flattened against the inside surface of the acoustically resistive layer 24.

Prior to this docking stage, the parts are prepared for undergoing a diffusion welding stage, for example with the aid of chemical descaling.

After this docking stage, according to the invention, the assembly of the alveolar structure with the unit formed by the acoustically resistive layer 24 and the channels 30 is initiated with the aid of a diffusion welding technique.

For this purpose, at least the areas to be assembled, namely the ends of the cells of the alveolar structure 26, the walls 32 that border the channels 30, and advantageously the acoustically resistive layer, are brought to a temperature that is higher than a given threshold. Concomitantly, a pressurized gas is injected into the channels 30 whose purpose is to produce an expansion of the walls 32 of the channels so as to flatten them against the ends of the cells of the alveolar structure 26, as illustrated in FIGS. 5A and 5B. Advantageously, a compressive force is simultaneously exerted whose purpose is to flatten the acoustically resistive layer 24 against the surface 46 of the alveolar structure 26.

The combination of the elevation of temperature and pressure leads to producing a continuous weld at the ends of the cells of the alveolar structure that are thus airtight with one another.

Of course, the temperature threshold and the minimum pressures depend on the materials that are used and more particularly their rheological characteristics relative to the superplasticity.

By way of example, for elements with a titanium alloy base, the temperature should reach 900° C. at the welding zones.

According to another advantage, this solution makes it possible to compensate for the geometric defects of cut-outs 50 and walls 32 that delimit the channels 30. Actually, the wall 32 can expand in a different way from one point to the next until coming into contact with the ends of the cells of the alveolar structure.

Advantageously, each cut-out 50 has an undercut shape as illustrated in FIGS. 4A and 4B. Each cut-out 50 comprises a cross-section with a bottom 52 and an opening 54 via which a channel 30 is introduced.

According to an illustrated embodiment, the cut-out 50 has a dovetail shape. However, the largest width of the cut-out is not necessarily provided at the bottom.

According to this variant, during the assembly phase, a deformation is made at the same time according to a superplastic hot-shaping technique and diffusion welding.

Thus, during assembly, the walls 32 of the channels 30, which do not necessarily have an undercut shape initially, expand in such a way as to assume the shapes of the cut-outs 50. Thus, after assembly, the walls 32 of the channels 30 have undercut shapes that prevent any removal of the cut-outs from the channels; this helps produce a resistant connection between the acoustically resistive layer 24 and the alveolar structure 26.

According to another application, the channels could be inserted between the reflective layer and the alveolar structure. In this case, the channels can be made from a single layer with furrows that, as above, are made integral with the reflective layer or from the strips of material as illustrated in the patent FR-2,917,067 that are made integral with the reflective layer. In this case, the surface of the alveolar structure that is flattened against the reflective layer comprises cut-outs 50 that are analogous to those of the surface 46 in the preceding example. Next, the reflective layer/ channels unit is assembled with the alveolar structure in the same way as the acoustically resistive layer/channels unit in the preceding example.

According to another application, the channels could be bordered by a wall with a closed cross-section similar to a tube. In this case, the alveolar structure comprises—for each channel—a cut-out that makes it possible to accommodate it.

Regardless of the variant, the panel comprises at least one channel that is bordered at least in part by a wall that is secant with at least one wall of a cell of the alveolar structure. The alveolar structure comprises at least one cut-out that makes it possible to accommodate the channel.

The wall of the channel is made of a material that has rheological characteristics relative to the superplasticity that are suitable for undergoing superplastic hot-shaping and diffusion welding.

Advantageously, the wall of the channel is made from a titanium alloy.

To ensure an assembly between the alveolar structure and the wall of a channel that makes it possible to produce an airtight connection, at least the areas that are to be assembled, namely the ends of the cells of the alveolar structure in contact with the wall of the channel, and the wall of the channel are brought to a temperature that is higher than a given threshold. Concomitantly, pressurized gas is injected into the channel whose purpose is to produce an expansion of the wall of the channel so as to flatten it against the ends of the cells of the alveolar structure.

The combination of the elevation of temperature and pressure leads to producing a continuous weld at the ends of the cells of the alveolar structure that are thus airtight with one another.

Of course, the threshold temperature and the minimum pressures depend on the materials that are used and more particularly their rheological characteristics relative to the superplasticity.

Preferably, when the cut-out that is made in the alveolar structure is arranged at one of the surfaces of the alveolar structure that is flattened against the acoustically resistive layer or the reflective layer, the cut-out has an undercut shape. Thus, during assembly, the wall of the channel, which does not necessarily have an undercut shape initially, expands in such a way as to assume the shapes of the cut-out 50. Thus, after assembly, the wall of the channel has an undercut shape that prevents any removal of the cut-out from the channel.

The invention claimed is:

1. A process for the production of an acoustic treatment panel having an acoustically resistive first layer, at least one multi-celled alveolar structure, and a reflective second layer, comprising the steps of:
providing a layer of material and shaping the layer of material so as to produce, at one surface of the layer of material, hollow shapes that form furrows in the layer of material;
flattening the layer of material with the furrows so as to make the layer of material integral with an inside surface of the acoustically resistive first layer so that the furrows and the inside surface of the acoustically resistive first layer form channels;
removing a portion of the layer of material, where the portion runs between each of the channels in a thickness direction;
cutting out at least one surface of the alveolar structure to yield at least one cut-out in the alveolar structure having an undercut shape configured to accommodate at least one of the channels;
providing the alveolar structure over the layer of material such that the at least one of the channels is received within the at least one cut-out of the alveolar structure;
providing the reflective second layer over the alveolar structure;
elevating a temperature of a wall of the at least one of the channels and ends of cells of the alveolar structure to achieve diffusion welding of the wall and the ends of the cells, the wall of the at least one of the channels being secant with at least one wall of a cell of the alveolar structure; and
injecting a pressurized gas into the at least one of the channels so as to expand the wall of the at least one of the channels that is secant with the at least one wall of a cell of the alveolar structure, and thereby flatten the wall of the at least one of the channels that is secant with the at least one wall of the cell of the alveolar structure against ends of walls of the cells of the alveolar structure so that a continuous weld by continuous diffusion is produced between the ends of the walls of the cells of the alveolar structure and the wall of the channel that is secant with the at least one wall of the cell of the alveolar structure.

2. The process according to claim 1, further comprising:
causing the wall of the at least one of the channels that is secant with the at least one wall of the cell of the alveolar structure to undergo superplastic hot-shaping.

3. The process according to claim 2, wherein the layer of material forming the channels is made of a titanium alloy.

4. The process according to claim 1, wherein, the removing of the portion of the layer of the layer of material forming the channels forms, for each channel, two lugs extending opposite one another on either side of the channel, the lugs resting on the inside surface of the acoustically resistive first layer and extending in a direction that is essentially parallel to the acoustically resistive first layer.

5. The process according to claim 4, wherein each of the lugs have a length of between 2 and 10 mm.

6. The process according to claim 1, wherein the portion of the layer of material is removed between the channels by water jet.

7. The process according to claim 1, wherein an entirety of the layer of material running between each of the channels in the thickness direction is removed.

8. A process for the production of an acoustic treatment panel, comprising the steps of:
providing an acoustically resistive first layer formed from a porous layer and a structural layer;
providing a layer of material, and shaping the layer of material so as to produce at one surface of the layer of material hollow shapes that form furrows on the one surface of the layer of material;
flattening the layer of material with the furrows so as to be made integral with an inside surface of the acoustically resistive first layer so that the furrows and the inside surface of the acoustically resistive first layer form channels;
removing a portion of the layer of material running between the channels in the thickness direction;
providing, over the inside surface of the acoustically resistive first layer, a multi-celled alveolar structure formed from a plurality of pipes;
providing a reflective second layer over the alveolar structure;

cutting out at least one surface of the alveolar structure to yield a cut-out having an undercut shape configured to accommodate at least one of the channels;

diffusion welding by elevating a temperature of the wall of the at least one of the channels and ends of cells of the alveolar structure; and injecting a pressurized gas into the at least one of the channels so as to expand a wall of the at least one of the channels, the pressurized gas flattening the wall of the at least one channel against the ends of the cells of the alveolar structure in such a way as to produce a continuous weld by continuous diffusion between the ends of second walls of the cells of the alveolar structure and the wall of the at least one of the channels, the wall of the at least one of the channels being secant with at least one wall of a cell of the alveolar structure.

9. The process according to claim 8, further comprising: causing the wall of the at least one of the channels to undergo superplastic hot-shaping.

10. The process according to claim 8, wherein layer of material forming the channels is made of a titanium alloy.

11. The process according to claim 7, wherein a portion of the acoustically resistive first layer between the channels in the thickness direction is removed.

* * * * *